United States Patent [19]

Ferree

[11] Patent Number: 4,936,427
[45] Date of Patent: Jun. 26, 1990

[54] WIRE CONDUCTING ROTARY COUPLING HAVING SEPARATE TORQUE CONDUCTING AND FLEXURE LOAD MEMBERS

[75] Inventor: Herbert E. Ferree, Hempfield, Pa.

[73] Assignee: Space Industries Partnership, L.P., Webster, Tex.

[21] Appl. No.: 264,610

[22] Filed: Oct. 31, 1988

[51] Int. Cl.$^5$ ............................................. H02G 11/00
[52] U.S. Cl. .................................. 191/12 R; 244/159; 439/13
[58] Field of Search ............... 191/12 R, 12.4, 12.2 A, 191/12.2 R; 439/11, 13, 14; 244/159

[56] References Cited

U.S. PATENT DOCUMENTS

| | | | |
|---|---|---|---|
| 932,970 | 8/1909 | Dodge | 191/12.2 R |
| 1,904,000 | 4/1933 | Hoyt | 191/12.2 R |
| 2,141,909 | 12/1938 | Hauser | 191/12.2 R |
| 3,001,034 | 9/1961 | Aitken | 191/12 R |
| 3,300,572 | 1/1967 | Dahlgren et al. | 174/69 |
| 3,412,951 | 11/1968 | Ober | 242/54 R |
| 3,466,588 | 9/1969 | Bradshaw | 439/164 |
| 3,599,165 | 8/1970 | Wendell et al. | 439/164 |
| 3,647,936 | 3/1972 | Dryg | 174/69 |
| 3,715,526 | 2/1973 | Blanch et al. | 191/12.2 R |
| 3,806,670 | 4/1974 | Van Toorn | 191/12 R |
| 3,848,361 | 11/1974 | Foster et al. | 49/167 |
| 3,848,711 | 11/1974 | Brenot et al. | 191/12 R |
| 3,959,608 | 5/1976 | Finalyson et al. | 191/12.2 R |
| 4,154,324 | 5/1979 | Upton et al. | 191/12.2 R |
| 4,357,500 | 11/1982 | Nilsen | 379/441 |
| 4,377,266 | 3/1983 | Belew et al. | 244/159 |
| 4,436,190 | 3/1984 | Wentzell | 191/12.2 R |
| 4,509,383 | 4/1985 | Yeh | 74/471 XY |
| 4,542,858 | 9/1985 | Manges | 242/54 R |
| 4,627,584 | 12/1986 | Kuhn et al. | 137/192 |
| 4,812,132 | 3/1989 | Gunnarsson | 439/13 |

FOREIGN PATENT DOCUMENTS

| | | | |
|---|---|---|---|
| 931785 | 7/1955 | Fed. Rep. of Germany | 191/12.2 R |
| 703931 | 2/1931 | France . | |
| 2385632 | 12/1978 | France . | |
| 728188 | 4/1980 | U.S.S.R. | 439/13 |
| 860192 | 8/1981 | U.S.S.R. . | |
| 862298 | 9/1981 | U.S.S.R. . | |

Primary Examiner—Andres Kashnikow
Assistant Examiner—Mark T. Le
Attorney, Agent, or Firm—Venable, Baetjer, and Howard

[57] ABSTRACT

A rotary coupling for transmitting torque across a plurality of flexible electrical wires is disclosed herein. The coupling generally comprises a tubular assembly for resisting flexure loads applied to the coupling that has a fixed portion and a rotatable portion, and a shaft member concentrically disposed within the tubular assembly for transmitting torque. First and second connectors are mounted around the inner wall of the fixed and rotatable portions of the tublular assembly, respectively and the second connector mechanically mounts the rotatable portion of the tubular assembly with the shaft member. A plurality of flexible electrical wires are disposed between the inner wall of the tubular assembly and the outer wall of the shaft member. Each of these wires includes a slack portion which is loosely wound around the shaft member and connected at either end to the first and second connectors, respectively. The disposition of the electrical wires within the tubular assembly obviates the need for a separate housing around the rotary coupling, and the provision of a mechanically separate flexure-resisting tubular assembly and torque-transmitting shaft results in a coupling having an advantageously small diameter.

25 Claims, 3 Drawing Sheets

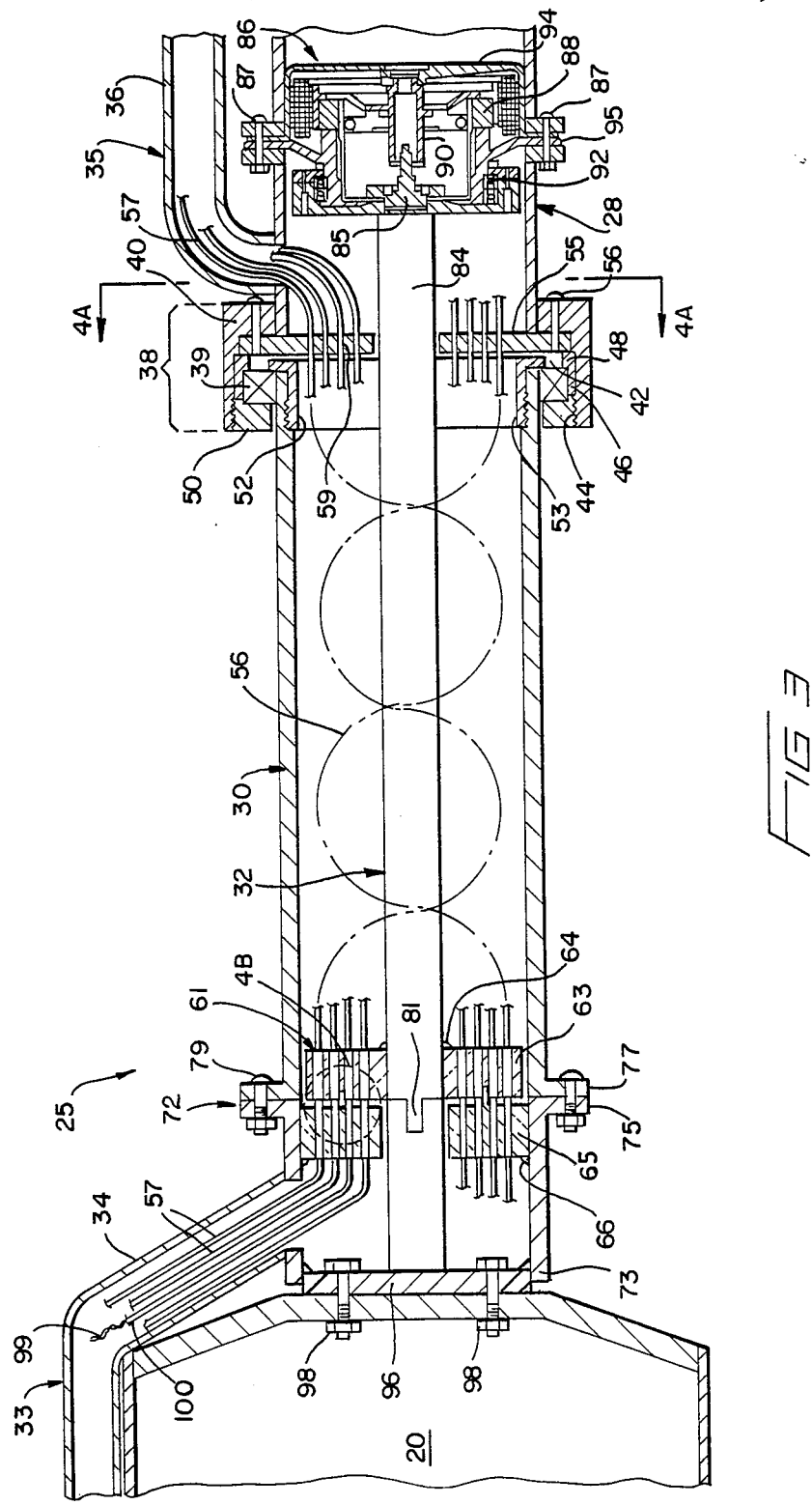

WIRE CONDUCTING ROTARY COUPLING HAVING SEPARATE TORQUE CONDUCTING AND FLEXURE LOAD MEMBERS

BACKGROUND OF THE INVENTION

This invention generally concerns a coupling for conducting both rotational movement and electrical current without the use of slip rings, and is specifically concerned with a small-diameter, low torque coupling that conducts rotational movement across a plurality of electrical wires while applying a minimum amount of stress on the wires.

Rotary couplings for conducting rotational movement across an array of electrical wires without the use of slip rings are known in the prior art. Such couplings find particular use in space applications, where telecommunication or electrical power currents must be transmitted over moveable joints on satellites, such as the joints in the support arms which connect a panel of solar cells to the main body of the satellite. Because the orientation of such solar panels must be constantly adjusted to maintain the cells in a perpendicular orientation with respect to the rays of the sun, the rotatable joints in such support arms must be capable of repeatedly rotating the panels 180 degrees to and fro while transmitting the electric power generated therefrom into the satellite body in a completely reliable manner. Slip rings have generally proved to be unsuitable for such power transmission as the high currents conducted through such slip rings tend to generate undesirable amounts of electromagnetic interference when the slip rings are rotated. Consequently, wire-conducting rotary joints have been constructed with the hope of achieving a rotary coupling capable of at least 180 degree movement in both a clockwise and a counterclockwise direction without the application of bending stresses on the wires passing therethrough which would cause these wires to either break or to short circuit as a result of repeated flexure.

One such wire conducting coupling is disclosed in U.S. Pat. No. 4,542,858. This design comprises a pair of relatively movable ring-type structures having plus or minus 180 degree relative rotation. The ring structures are interconnected by, inter alia, a pair of concentrically coiled metal bands which resemble intersecting watch springs. Electrical wires traversing the two ring-type structures are disposed between the two inter-nesting coiled metal bands. Sufficient slack is allowed in the portion of the wires captured between the two coiled metal bands so that little stress is applied to these wires when the coiled metal bands are wound tighter or looser due to rotational movement. In another design known in the art as a "twist-flex" coupling, two disc-like members are rotatably interconnected by means of an axially disposed shaft. A plurality of electrically conducted wires axially disposed with respect to the shaft are connected around the circumference of each of the circular members. Sufficient slack is incorporated into each of the wire segments disposed between the two circular members so that the outline of the structure generally resembles an hourglass. The wires generally remain spaced apart and parallel with respect to one another even when the two circular members are twisted with respect to one another, the only difference being that when some of the slack is pulled out of each of the wires due to rotation, the wires go from a parallel to an oblique orientation with respect to the longitudinal axis of the shaft of the coupling.

The demands made upon such wire-conductive, rotary couplings can be considerable. For example, in the orbiting Industrial Space Facility in the planning stages at the Westinghouse Electric Corporation, such couplings must be able to handle 200 or more 16 gauge wires for over 65,000 cycles between limits of plus and minus 180 degrees over ten years without breakage due to flexing. "Industrial Space Facility" is a trademark of Space Industries, Inc. Moreover, such coupling should take up a minimum of space and weight and should be able to perform its task without requiring any undue lengthening of the wire segments which traverse it that would result in unwanted electrical resistance. Finally, such a coupling should be rotatable upon the application of a minimum and uniform amount of torque. Unfortunately, neither of the aforementioned prior art designs completely fulfills these criteria. Rotary couplings utilizing concentrically coiled metal bands as previously described are not well suited to handle a large number of thick wire strands. While it is conceivable that the prior art designs of such couplings might be modified to handle greater numbers of electrical wires, such modifications would increase both the size and weight of the unit as a whole, thereby defeating one of the primary design objectives of the coupling. Additionally, the confinement of the wires between the metal bands impedes the ability of the coupling to safely dissipate the heat generated by the wires by virtue of electrical resistance. While the "twist flex" prior art design does have the ability to handle the number and type of wires necessary to conduct the current generated by a large panel of solar cells, the slack wire in the wire segments has a great deal of freedom of movement in the particular coupling which can lead to erratic wire movements and orientations that not only can increase or render nonuniform the amount of torque needed to twist the coupling, but can further increase the likelihood of wire breakage due to flexure. While ribbon-type wire conductors could be used which would minimize the problem associated with erratic wire movements, such ribbon conductors impede the repair of a broken wire within the coupling. Finally, the separate exterior micrometeorite shield that such prior art "twist flex" designs require increases both the diameter and overall weight of the coupling.

Clearly, there is a need for a wire conducting rotary coupling which is free of the shortcomings of the prior art, and capable of conducting a large number of heavy-gauge wires in a relatively stress-free manner in a structure which is both compact and lightweight. Ideally, such a coupling should require only very short amounts of slack wire to perform its functions so as to minimize power losses. It would be desirable if the wire segments in such a coupling were arranged so as to maximize radiative heat losses. Finally, such a coupling should be configured so as to provide a maximum amount of protection against micrometeorites without the need for a weight and diameter increasing housing, and include a means for closely controlling the movement of the slack portions of the wire segments so as to maintain the uniformity of the torque needed to turn the coupling and to minimize the probability of erratic wire movements which could stress and break the wires.

SUMMARY OF THE INVENTION

Generally speaking, the invention is a rotary coupling for conducting rotational movement across a plurality of electrical wires with a minimum of stress which achieves all of the aforementioned objectives. The invention comprises a tubular assembly for resisting flexure loads that has a fixed portion and a rotatable portion, and a shaft member for transmitting torque to the coupling that is disposed with the tubular assembly. First and second connectors are mounted around the inner wall of the fixed and rotatable portions of the tubular assembly, and the second connector mechanically connects the rotatable portion of the tubular assembly with the shaft member. A plurality of flexible electrical wires are contained between the inner wall of the tubular assembly and the outer wall of the shaft member, and each of these wires has a slack portion loosely wound around the shaft member and connected at its ends to the first and second connectors, respectively. In operation, the slack portions of each of the wires is wound more or less around the shaft member as the rotatable portion of the tubular assembly is rotated clockwise or counterclockwise. In the preferred embodiment, the slack portions of the wires are twisted around the shaft member approximately two and one-half times, thereby insuring against erratic wire movements during reverse rotation which could either increase the torque requirements of the coupling, or apply undue amounts of stress on the wires.

A ring-type bearing preferably interconnects the fixed and rotatable portions of the tubular assembly. To facilitate the assembly and disassembly of the coupling, a ring-type seal nut detachably interconnects the fixed and rotatable portions of the tubular assembly. To further facilitate the assembly and disassembly of the coupling, the second connector includes a plurality of terminals for detachably connecting the ends of the slack portions of the wires to the remainder of the ires. Additionally, the torque-transmitting shaft member includes a shaft coupler adjacent to the second connector.

To minimize the torque required to twist the coupling, each of the wires are formed from stranded wire filaments covered by a thin insulating layer of a nonvolatile, heat resisting plastic material. In the preferred embodiment, a five to ten mil thick layer of Teflon ® is used.

The tubular assembly preferably forms an integral part of one of the flexure beams used in a solar panel support arm. The provision of a separate torque-transmitting shaft and flexure resisting tubular assembly, in combination with the fact that the wires are mounted in the annular space between the tubular assembly and the torque-transmitting shaft member obviates the need for a separate diameter-increasing micrometeorite housing around the coupling.

BRIEF DESCRIPTION OF THE DRAWINGS

FIG. 3 is a cross-sectional side view of the rotary coupling illustrated in FIG. 2.

DETAILED DESCRIPTION OF THE PREFERRED EMBODIMENT

Figure 1:
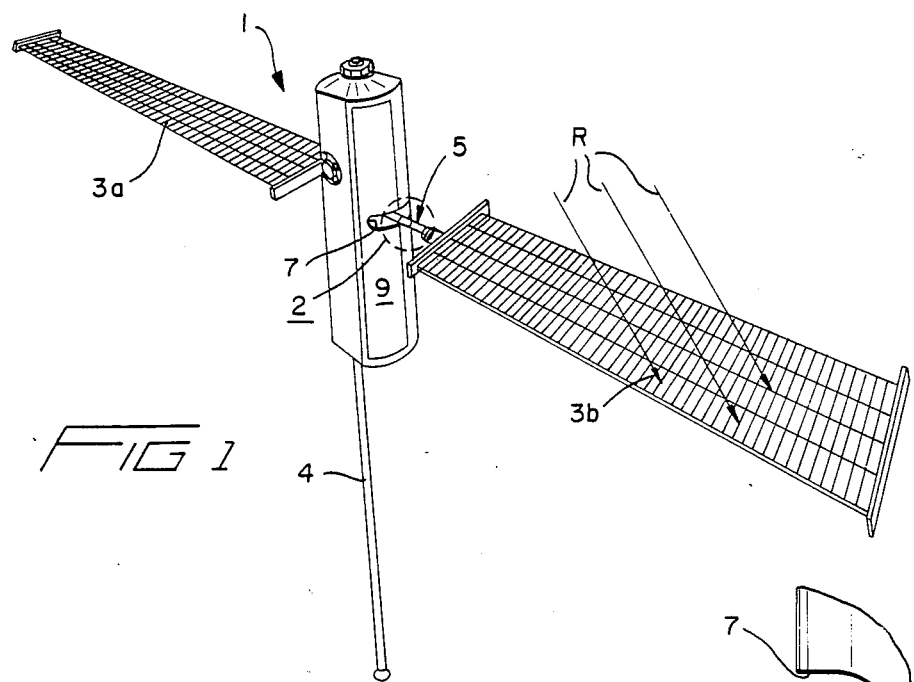
FIG. 1 is a perspective view of an orbiting Industrial Space Facility having a generally cylindrical housing, and a pair of solar panels connected thereto by means of articulated joint assemblies where the rotary coupling of the invention finds particular use.
Figure 2:
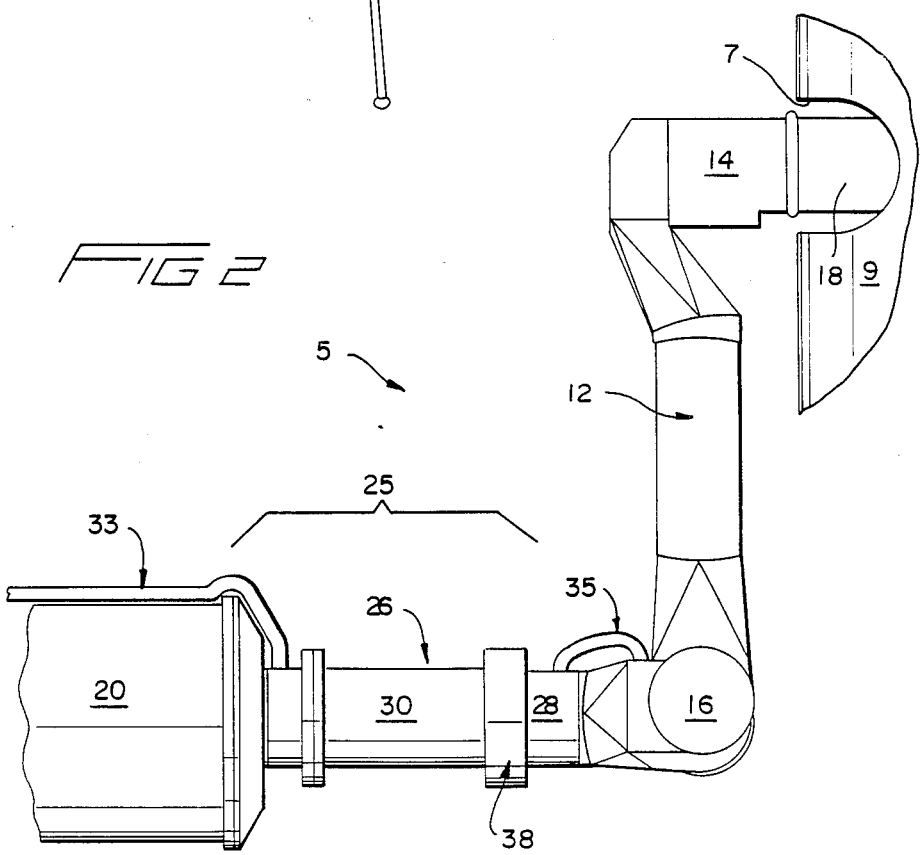
FIG. 2 is an enlarged side view of an articulated joint assembly which incorporates the rotary coupling of the invention.

With reference now to FIGS. 1 and 2, wherein like reference characters designate like components throughout all the several figures, the invention finds particular utility in conjunction with an orbiting Industrial Space Facility 1. Such a facility generally includes a pair of opposing solar panels 3a, 3b projecting from its sides, and a stabilizing boom 4 at one end. Articulated joint assemblies 5 connect the solar panels 3a, 3b to the main body of the facility 1 by way of a slot 7 disposed in its generally cylindrical housing 9. As may best be seen in FIG. 2, each of the joint assemblies 5 includes a support arm 12 having pivot joints 14 and 16 at its proximal and distal ends, respectively. The proximal pivot joint 14 connects the support arm 12 to a support member 18 which forms part of the frame (not shown) disposed within the housing 9 of the facility 1. The distal pivot joint 16 connects the distal end of the support arm 12 to a solar array canister 20 by way of the rotary coupling 25 of the invention. With reference now to FIG. 2, the rotary coupling 25 includes a tubular assembly 26 formed from a fixed tubular member 28 which is coupled to a rotatable member 30. The tubular assembly 26 preferably forms an integral part of the support arm 12. Contained within the tubular assembly 26 are over 200 sixteen gauge stranded wires, each of which is connected to one of the solar cells mounted on the solar panels 3a, 3b. As will be described in greater detail hereinafter, the plurality of wires that comprise the power input cable 33 are spread apart at the distal end of the coupling 25 and uniformly spaced around the peripheries of the various circular elements contained within the tubular assembly 26, and are regathered near the proximal end of the coupling 25 to form power outlet cable 35. Both the power inlet and outlet cables are sheathed in a flexible, breathable spiral-type metallic sheathing 34, 36 (shown in FIG. 3) of a type known in the prior art. The power outlet cable 35 extends through the interior of the articulated joint assembly 5 and on through the frame member 18 where it may be used to power the various components of the Industrial Space Facility 1.

In operation, as the space facility 1 orbits the earth, it is necessary for each of the solar panels 3a, 3b to continuously maintain a relatively perpendicular orientation with respect to the rays of the sun (which are designated by the arrow R). Failure to maintain such a perpendicular orientation will, of course, result in a loss of power output from the solar panels 3a, 3b. To this end, the articulated joint assembly 5 must continuously rotate the solar array canister 20 to and from with respect to the distal pivot joint 16. As such a space facility 1 may last over ten years, it is estimated that the rotary coupling 25 will have to perform over 65,000 rotational cycles if the solar panels 3a, 3b are to be maintained in a proper power generating orientation. While adjustments to the orientation of the panels 3a, 3b may also be made by moving the proximal and distal pivot joints 14 and 16, it is anticipated that the primary rotary movement will occur through the coupling 25.

The tubular assembly 26 is designed to withstand all of the flexure loading which may occur between the articulated arm 5 and the solar array canister 20. Additionally, the rotatable member 30 of the assembly 26 advantageously serves as a micrometeorite shield for all of the wires contained within the coupling, which not only obviates the need for a separate shielding structure, but further results in a coupling 25 having a minimal diameter. Hence both the fixed and rotatable members 28 and 30 which form the tubular assembly 26 are each formed from 8 gauge, 2219-T4 aluminum. Such a metal is not only lightweight; its relatively low density gives it good anti-buckling characteristics. The fixed and rotatable members 28 and 30 of the tubular assembly 26 are rotatably interconnected by means of a bearing assembly 38 which includes an annular ball bearing 39 (visible in FIG. 3) having an inner and an outer race. As this bearing 39 must withstand all of the flexure loading which occurs between the solar array canister 20 and the articulated joint assembly 5, bearing 39 is preferably a "reali-slim," X-type bearing manufactured by Kaydon Corporation located in Muskegon, Michigan. Such a bearing is advantageously characterized by a low annular profile, and not only is capable of rotatably interconnecting the tubular members 28 and 30, but also is able to simultaneously withstand the opposing thrust load which will be applied to it as a result of flexure loading on the tubular assembly 26. To mount the bearing 39 in proper relationship between the tubular members 28 and 30, the bearing assembly 38 includes a mounting ring 40 having an annular recess 42 into which the bearing 39 is received. Ring 40 may be welded or brazed to tube 28. The free edge of the ring 40 terminates in screw threads 44 whose purpose will become evident presently. Also disposed within the annular recess 42 is a bearing spacer ring 46 which has an annular shoulder 48 for spacing the bearing away from the wire mounting disc 55. An annular retaining nut 50 having screw threads which complement the threads 44 of the mounting ring 40 captures the outer race of the bearing 39 within the annular recess 42 of the mounting ring 40. Thus the sides of the bearing 39 are disposed between the annular shoulder 48 of the bearing retaining ring 46 on one side, and the face of the annular retaining nut 50 on the other side. It should be noted that the mounting ring 40 and the retaining nut 50 serve the additional function of providing micrometeorite protection for the bearing 39. While the outer race of the bearing 39 is press fitted or otherwise secured to the bearing retaining ring 46, the inner race is retained by retaining shoulder ring nut 52 or otherwise secured around the outer wall of the proximal end of the rotatable tubular member 30. To insure that the tubular members 28 and 30 will remain axially interconnected, the retaining shoulder ring nut 52 circumscribes the proximal end of the rotatable tubular member 30 in the position shown between the proximal wire mounting disc 55, and the proximal side of the bearing 39. This retaining shoulder ring nut 52 includes a threaded end 53 which screws into threads provided along the inner diameter of the proximal end of rotatable tubular member 30. During assembly, both the inner and outer rings of bearing 39 are tightly clamped by nuts 52 and 50 to assure assembly. In operation, the fixed tubular member 28, the bearing mounting ring 40 and the proximal wire mounting disc 55 (which is connected to the inner face of the annular recess 42 by means of screws 56), the bearing retaining ring 46, the annular shoulder 48 and the annular sealing nut 50 all remain stationary while the inner race of the bearing 39, the rotatable tubular member 30, and its retaining shoulder ring nut 52 all rotate whenever the torque-transmitting shaft member 32 rotates the solar array canister 20.

Figure 4A:
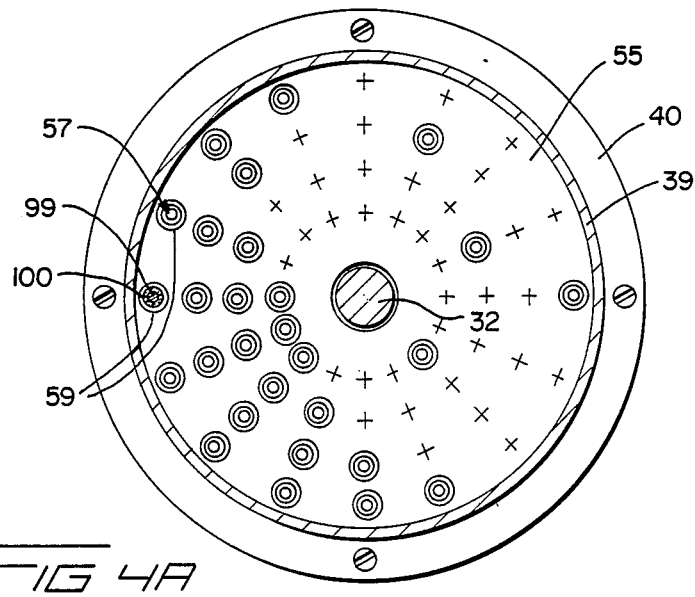
FIGS. 4A and 4B are cross-sectional views of the coupling illustrated in FIG. 3 along the lines 4A—4A and 4B—4B.
Figure 4B:
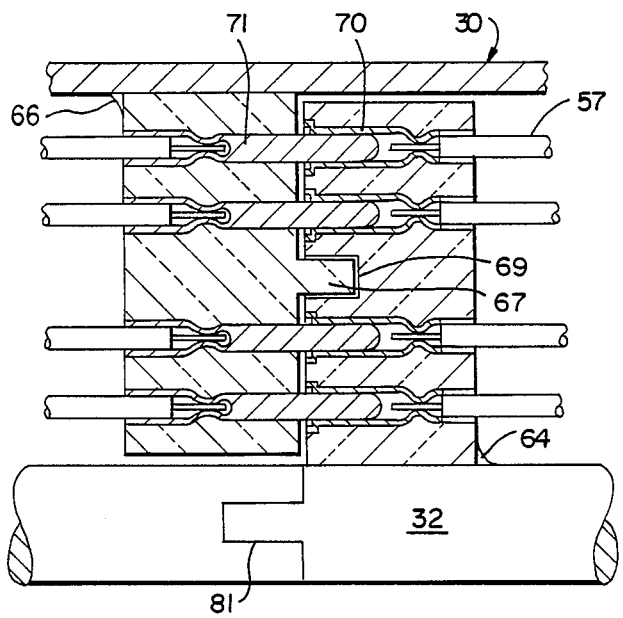

With reference now to FIGS. 3, 4A, and 4B, the purpose of the proximal wire mounting disc 55 is to stationarily mount one end of the slack segments 56 of the electrical wires 57 which traverse the coupling 25 through input and output cables 33 and 35. To this end, the proximal wire mounting disc 55 includes a plurality of wire guiding bores 59 arranged both along its radius and along its circumference as shown. The circumferential arrangement of the guiding bores 59 helps to prevent the individual electrical wires 57 from becoming tangled with one another, while the radial arrangement of these bores 59 allows the coupling 25 to conduct a large number of such wires. In the preferred embodiment, the proximal wire mounting disc 55 will have over 200 of such wire guiding bores 59. In the preferred embodiment, wire mounting disc 55 is formed from a lightweight, insulating material which is resistant to extremes in temperature, such as the fluorocarbon plastic material Teflon ®. Teflon ® has the added advantage of having self-lubricating properties which would minimize wear between the wire guiding bores 59 and the insulating material which surrounds each of the electrical wires 57.

Disposed opposite to the proximal wire mounting disc 55 is a distal wire mounting assembly 61. Like the proximal wire mounting disc 55, one of the purposes for the distal wire mounting assembly 61 is to retain the other ends of the slack segments 56 of each of the electrical wires 57. Additionally, the distal wire mounting assembly 61 advantageously facilitates both the assembly and disassembly of the rotary coupling 25, and further affords relatively easy access to each of the slack segments 56 of the wires 57. To this end, the distal wire mounting assembly 61 includes a socket disc 63 which is connected by way of a bead of cement 64 to the torque-transmitting shaft 32, and a pin disc 65 that is connected by way of a bead of cement 66 along its outer circumference to the rotatable tubular member 30. The socket disc 63 and the pin disc 65 are mechanically "keyed" together by a plurality of pegs 67 which are receivable within complementary recesses 69 (best seen in FIG. 4B). as its name would imply, the socket disc 63 includes a plurality of copper sockets 70 arranged along the surface of the disc 63 in the same configuration as the previously discussed wire guiding bores 59 of the proximal wire mounting disc 55. Similarly, the pin disc 65 includes a plurality of pin connectors 71 arranged in the same configuration so that each of the pin connectors 71 may be inserted into one of the socket connectors 70 when the pegs 67 and recesses 69 of the mechanical "key" are in proper alignment. Both the socket disc 63 and pin disc 65 are formed from a strong, heat resistant and insulation material such as Teflon ®.

Complementing the disassembly function of the distal wire mounting assembly 61 is a connecting flange 72 which circumscribes the proximal end of the rotatable tubular member 30, as well as a shaft coupling 81. The connecting flange 72 serves to interconnect the main body of the rotatable tubular member 30 to a tubular distal end section 73. It is formed from mutually abutting annular shoulders 75 and 77 formed along the opposing edges of the tubular member 30 and the distal tube end section 73, in combination with a plurality of uniformly spaced securing bolts 79 which connect the shoulders 75 and 77 together. While the shaft coupling 81 is shown in the form of a simple mechanical key between two separate shaft sections, any pull-apart coupling would function just as well within the context of the invention. The distal wire mounting assembly 61, the connecting flange 72 and the shaft coupling 81 allow the rotary coupling 25 to become completely detached between the shoulders 75 and 77 upon the removal of the bolts 79 in the application of a tensile axial force.

The shaft member 32 conducts torque to its proximal end 84 which is generated by the output member 85 of a rotary actuator 86 which is mounted within the fixed tubular member 28 by means of screws 87. The rotary actuator 86 includes a motor rotor 88 which is in turn connected to a centrally disposed and axially aligned shaft 90 connected to the output member 85 at its distal end. The actuator 86 further includes an output bearing 92 around its circumference for maintaining the output member 85 in concentric relationship with the fixed tubular member 28 during rotation. The actuator 86 is contained within a housing 94 circumscribed by a mounting flange 95 having bores (not shown) registrable with the previously mentioned mounting screws 87. The shaft member 32 conducts torque generated by the rotary actuator 86 all the way to a drive disc 96 welded to its distal end. The drive disc 96 is in turn connected to the proximal end of the solar array canister 20 by means of nuts and bolts 98 and to torque tube 73 via welding.

With references now to FIGS. 3 and 4A, each of the wires 57 and their respective segments 56 is a 16 gauge stranded wire 99 surrounded by an insulatory covering 100 of 5 to 10 mils of a heat resistant, flexible fluorocarbon plastic such as Teflon ®. As was pointed out with respect to the wire mounting disc 55, Teflon ® has the added advantage of being self-lubricating, thereby minimizing the opportunity for the wires to become frayed where they interface with the wire guiding bores 59 in mounting disc 55. The use of stranded, as opposed to solid wire, not only minimizes the possibility of a wire 57 from becoming broken due to repeated flexure, but also minimizes the amount of torque necessary to rotate member 30 with respect to fixed member 28 of the tubular assembly 26. In the preferred embodiment each of the wire segments 56 is loosely twisted around the torque-transmitting shaft 32 approximately two and one-half times. The applicant has observed that two and one-half turns applies a sufficient amount of retaining force to each of the wires 57 to maintain them loosely parallel to one another even during reverse twisting when the wires 57 are becoming unwound from the shaft 32. While a fewer number of turns would operable, and would further have the advantage of minimizing the necessary length (and hence the electrical resistance) of the wire segments 56, the possibility of erratic and stress-causing relative movements between the segments 56 would increase. At any rate, an absolute minimum of one-half of a turn is necessary to provide enough wire to achieve the desired objective of the rotary coupling 25. While more turns could be used, any additional turns over and above two and one-half would have the negative effect of increasing the length (and hence the electrical resistance) of the wire segments 56. Additionally, the amount of resistance that the wire segments 56 apply to the rotary actuator 86 would disadvantageously increase.

I claim:

1. A rotary coupling for transmitting torque across a plurality of flexible electrical wire means, comprising:
    a tubular assembly for resisting flexure loads applied to the coupling that has a fixed portion and a rotatable portion;
    a shaft member for transmitting torque through the coupling that is disposed within said tubular assembly;
    first and second connector means mounted around the inner wall of the fixed and rotatable portions of the tubular assembly, respectively, wherein said second connector means connects the rotatable portion with said shaft member, and
    a plurality of flexible electrical wire means disposed within said tubular assembly, each wire means having a slack portion loosely wound around said shaft member and connected at its ends to said first and second connector means, respectively.

2. The rotary coupling defined in claim 1, wherein said tubular assembly further includes a bearing means for rotatably connecting said fixed and rotatable portions of said tubular assembly.

3. The rotary coupling defined in claim 1, wherein said slack portion of each wire means is loosely wound around said shaft member at least once.

4. The rotary coupling defined in claim 1, wherein the ends of said slack portions of said wire means are substantially uniformly connected around the perimeters of the first and second connector means.

5. The rotary coupling defined in claim 1, wherein the ends of said slack portions of said wire means are substantially uniformly distributed throughout the opposing faces of the first and second connector means.

6. The rotary coupling defined in claim 1, wherein said second connector means includes means for detachably connecting the ends of the slack portions of said wires to the remainder of said wires.

7. The rotary coupling defined in claim 1, wherein said shaft member includes a shaft coupler adjacent to where said second connector means is connected to said shaft member to facilitate assembly and disassembly of said rotary coupling.

8. The rotary coupling defined in claim 1, wherein said flexible electrical wire means are each formed from stranded wire covered by an insulating layer of nonvolatile heat resisting plastic material.

9. The rotary coupling defined in claim 8, wherein said insulating layer is formed from a fluorocarbon plastic that is between 5 and 10 mils thick.

10. The rotary coupling defined in claim 2, further including means for removably mounting said bearing means to said tubular assembly to facilitate assembly and disassembly.

11. A rotary coupling for transmitting torque across a plurality of flexible electrical wire means, comprising:
    an elongated tubular assembly for resisting flexure loads applied across the coupling, said assembly including fixed tubular member and a movable tubular member disposed in tandem;
    a shaft member for transmitting torque through the coupling that is concentrically disposed within said assembly along the longitudinal axis thereof;
    first and second connector means mounted around the inner wall of the fixed and rotatable members of the tubular assembly, respectively, wherein said second connector means connects the rotatable tubular member with the shaft member, and
    a plurality of flexible electric wire means disposed within said tubular assembly, each wire means having a slack portion loosely wound around said shaft member and connected at its ends to said first and second connector means, respectively.

12. The rotary coupling defined in claim 11, wherein said slack portion of each wire means is loosely wound around said shaft member at least once, but no more than three times.

13. The rotary coupling defined in claim 11, wherein said slack portion of each wire means is loosely wound around said shaft member at least twice, but no more than three times.

14. The rotary coupling defined in claim 11, wherein said tubular assembly further includes a bearing means connected between said fixed and rotatable movable tubular members.

15. The rotary coupling defined in claim 11, wherein the ends of said slack portions of said wire means are substantially uniformly connected around the perimeters of the first and second connector means.

16. The rotary coupling defined in claim 11, wherein the ends of said slack portions of said wire means are substantially uniformly distributed throughout the opposing faces of the first and second connector means.

17. The rotary coupling defined in claim 11, wherein said shaft member includes a shaft coupler adjacent to where said second connector means is connected to said shaft member to facilitate assembly and disassembly of said rotary coupling.

18. The rotary coupling defined in claim 11, wherein said first and second connector means are each substantially formed from an insulating, nonvolatile fluorocarbon plastic.

19. The rotary coupling defined in claim 14, further including means for removably mounting said bearing means to said tubular assembly to facilitate assembly and disassembly.

20. The rotary coupling defined in claim 11, wherein each of said wire means is a 16 gauge stranded wire covered by a layer of between 5 and 10 mils of Teflon ®.

21. A rotary coupling for transmitting torque across a plurality of flexible electrical wire means, comprising:
an elongated tubular assembly for resisting flexure loading applied transverse to the longitudinal axis of the assembly and for shielding the interior of the coupling from micrometeorites including first and second tubular members disposed in tandem, a bearing means connected therebetween for rendering the second tubular member movable with respect to the first, and a lock nut means for removably mounting said second tubular member to the first tubular member;

a shaft member for transmitting torque through the coupling, said member being concentrically disposed within said tubular assembly along the longitudinal axis of said tubular assembly;

first and second connector means mounted around the inner wall of the first and second tubular members, respectively, both of which are formed from an insulating fluorocarbon plastic, wherein said second connector means connects the second tubular member with the shaft member; and a plurality of flexible electrical wire means disposed within said tubular assembly, each wire means having a slack portion loosely wound around said shaft member between two and three times and connected at its ends to said first and second connector means, respectively.

22. The rotary coupling defined in claim 21, wherein the ends of said slack portions of said wire means are substantially uniformly distributed throughout the opposing faces of the first and second connector means.

23. The rotary coupling defined in claim 21, wherein said second connector means includes means for detachably connecting the ends of the slack portions of said wires to the remainder of said wires.

24. The rotary coupling defined in claim 21, wherein said shaft member includes a shaft coupler adjacent to where said second connector means is connected to said shaft member to facilitate assembly and disassembly of said rotary coupling.

25. The rotary coupling defined in claim 21, wherein each of said wire means is a 16 gauge stranded wire covered by a layer of between 5 and 10 mils of Teflon ®.

* * * * *